United States Patent
Chang

(10) Patent No.: US 8,335,085 B2
(45) Date of Patent: Dec. 18, 2012

(54) LINKAGE MECHANISM CAPABLE OF ROTATING ROTATABLE LIDS SYNCHRONOUSLY AND RELATED COMPUTER HOST

(75) Inventor: Chun Chang, Taipei Hsien (TW)

(73) Assignee: Aopen Inc., Xizhi Dist., New Taipei (TW)

( * ) Notice: Subject to any disclaimer, the term of this patent is extended or adjusted under 35 U.S.C. 154(b) by 270 days.

(21) Appl. No.: 12/876,244

(22) Filed: Sep. 7, 2010

(65) Prior Publication Data

US 2011/0113691 A1 May 19, 2011

(30) Foreign Application Priority Data

Nov. 13, 2009 (TW) .............................. 98138652 A

(51) Int. Cl.
*H05K 7/16* (2006.01)
*H05K 5/00* (2006.01)
*H05K 7/00* (2006.01)

(52) U.S. Cl. .................... 361/727; 361/726; 361/679.37; 361/679.38; 361/679.39; 361/679.57; 361/679.58

(58) Field of Classification Search .. 361/679.31–679.4, 361/679.55–679.6, 724–727; 312/223.1, 312/223.2; 439/60, 151–160, 327, 328, 331, 439/638

See application file for complete search history.

(56) References Cited

U.S. PATENT DOCUMENTS

| 4,325,091 | A | * | 4/1982 | Uchida | ........................ 360/96.61 |
| 4,432,467 | A | * | 2/1984 | Swingley, Jr. | .................. 220/826 |
| 5,559,672 | A | * | 9/1996 | Buras et al. | .............. 361/679.32 |
| 2010/0165564 | A1 | * | 7/2010 | Lu | .............................. 361/679.35 |

* cited by examiner

*Primary Examiner* — Jayprakash N Gandhi
*Assistant Examiner* — Jerry Wu
(74) *Attorney, Agent, or Firm* — Winston Hsu; Scott Margo

(57) ABSTRACT

A linkage mechanism includes a case, a fixing part, a first rotatable lid, and a second rotatable lid. A first opening and a second opening are formed on the case. The first rotatable lid is rotatably disposed on the first opening and pivotally connected to the fixing part for covering the first opening. A first protruding part is formed on the first rotatable lid. The second rotatable lid is rotatably disposed on the second opening and pivotally connected to the fixing part for covering the second opening. When the first rotatable lid and the second rotatable lid cover the first opening and the second opening respectively, the first protruding part abuts against the second rotatable lid.

19 Claims, 6 Drawing Sheets

LINKAGE MECHANISM CAPABLE OF ROTATING ROTATABLE LIDS SYNCHRONOUSLY AND RELATED COMPUTER HOST

BACKGROUND OF THE INVENTION

1. Field of the Invention

The present invention relates to a linkage mechanism and a related computer host, and more specifically, to a linkage mechanism capable of rotating rotatable lids synchronously and a related computer host.

2. Description of the Prior Art

In general, there is usually a drive expansion slot or a card reader disposed at a front end of a computer case for data update or software upgrade in design of a computer system or a server, so as to allow a user to install an additional disk drive or insert a memory card conveniently. However, this design may not only cause a problem of dust entering the computer host easily, but also have a safety concern since a drive installed in the said drive expansion slot may be easily removed. Thus, for achieving the dustproof and burglarproof purposes, a rotatable lid is additionally disposed on the computer case for covering the drive expansion slot or the card reader. A common design involves utilizing a side-lifting lid pivotally connected to the computer case, a slidable lid capable of sliding upward and downward relative to the computer case along a guiding rail, or an inversion lid capable of overturning inwardly relative to the computer case for reducing its occupied space.

However, the said side-lifting lid or the said slidable lid is incapable of applying to a small-sized computer due to the limited inner space of the small-sized computer. On the other hand, although the inversion lid can solve the said problem of insufficient space via its inwardly-overturning design, operation of the inversion lid is time-consuming since the inversion lid is incapable of covering all devices installed at the front end of the computer case synchronously.

Thus, how to design a rotatable lid capable of reducing its occupied space and increasing its use convenience should be a concern for a computer host in its structural design.

SUMMARY OF THE INVENTION

The present invention provides a linkage mechanism capable of rotating rotatable lids synchronously, the linkage mechanism comprising a case having a first opening and a second opening formed thereon; a fixing part disposed at a side of the first opening and a side of the second opening; a first rotatable lid rotatably disposed on the first opening and pivotally connected to the fixing part for covering the first opening, a first protruding part being formed on the first rotatable lid; and a second rotatable lid rotatably disposed on the second opening and pivotally connected to the fixing part for covering the second opening, the first protruding part abutting against the second rotatable lid when the first rotatable lid and the second rotatable lid cover the first opening and the second opening respectively.

The present invention further provides a computer host capable of rotating rotatable lids synchronously, the computer comprising a linkage mechanism capable of rotating rotatable lids synchronously, the linkage mechanism comprising a case having a first opening and a second opening formed thereon; a fixing part disposed at a side of the first opening and a side of the second opening; a first rotatable lid rotatably disposed on the first opening and pivotally connected to the fixing part for covering the first opening, a first protruding part being formed on the first rotatable lid; and a second rotatable lid rotatably disposed on the second opening and pivotally connected to the fixing part for covering the second opening, the first protruding part abutting against the second rotatable lid when the first rotatable lid and the second rotatable lid cover the first opening and the second opening respectively; a first electronic device disposed at a position of the linkage mechanism corresponding to the first opening; and a second electronic device disposed at a position of the linkage mechanism corresponding to the second opening.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
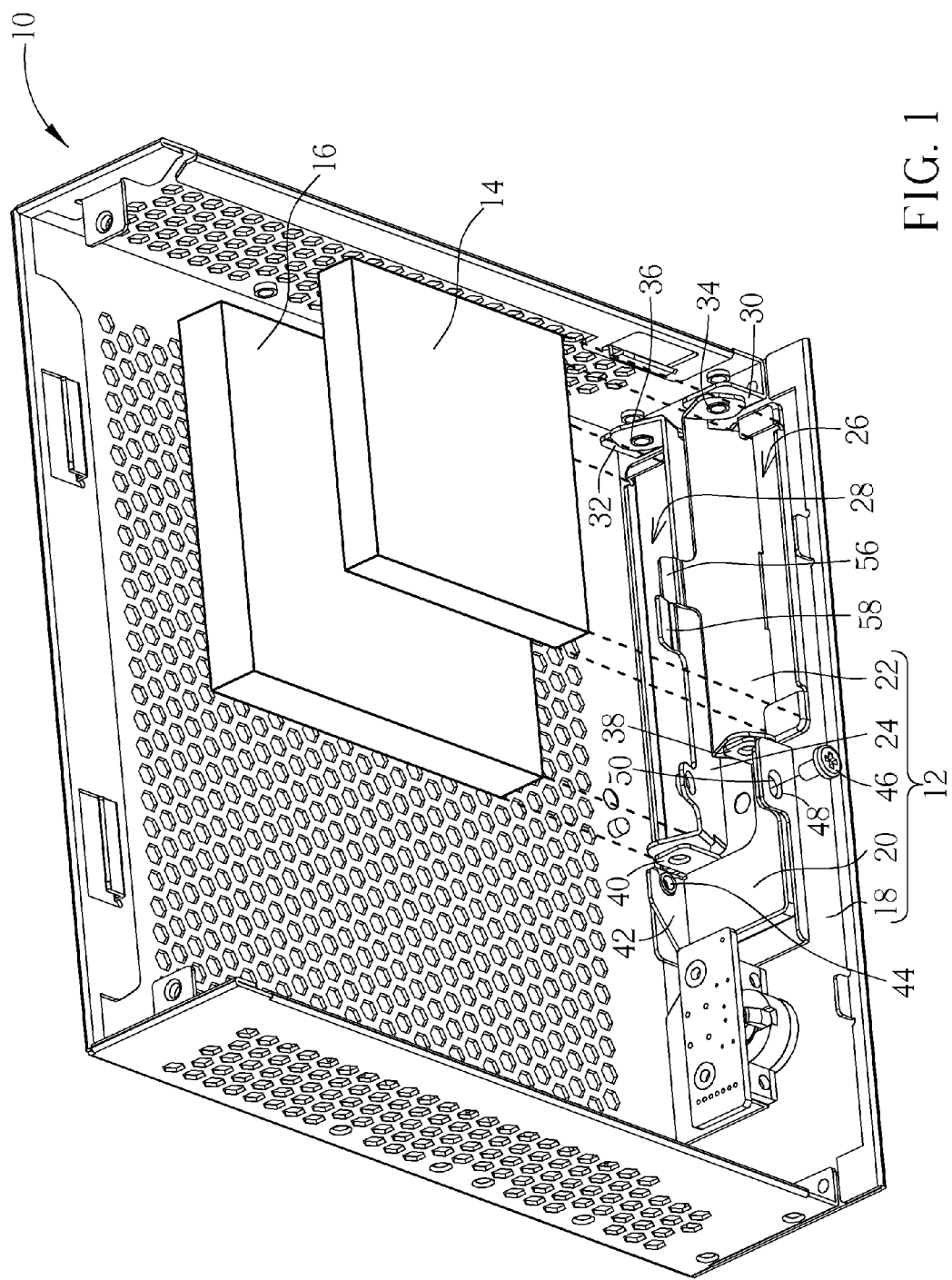
FIG. 1 is an inner diagram of a computer host according to a preferred embodiment of the present invention.

Please refer to FIG. 1, which is an inner diagram of a computer host 10 according to a preferred embodiment of the present invention. As shown in FIG. 1, the computer host 10 includes a linkage mechanism 12, a first electronic device 14, and a second electronic device 16. The linkage mechanism 12 includes a case 18, a fixing part 20, a first rotatable lid 22, and a second rotatable lid 24. A first opening 26 and a second opening 28 are formed on the case 18. Furthermore, the case 18 has a first pivot portion 30 formed at a side of the first opening 26 and a second pivot portion 32 formed at a side of the second opening 28, and a first positioning pillar 34 and the second positioning pillar 36 are formed on the first pivot portion 30 and the second pivot portion 32, respectively. In this embodiment, the first positioning pillar 34 and the second positioning pillar 36 are preferably a hollow circular pillar.

Figure 2:
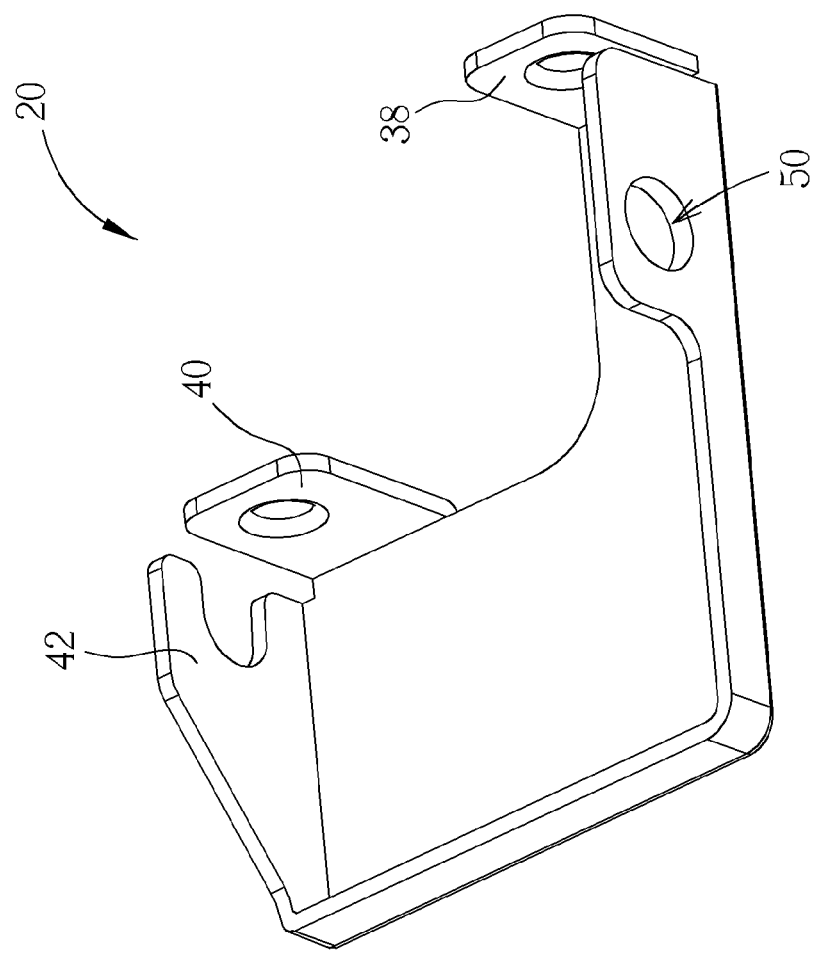
FIG. 2 is an enlarged diagram of a fixing part in FIG. 1.

Next, please refer to FIG. 1 and FIG. 2. FIG. 2 is an enlarged diagram of the fixing part 20 in FIG. 1. As shown in FIG. 1 and FIG. 2, the fixing part 20 is disposed adjacent to the first opening 26 and the second opening 28. A third pivot portion 38 and a fourth pivot portion 40 are formed on the fixing part 20 corresponding to the first pivot portion 30 and the second pivot portion 32, respectively. Furthermore, an engaging portion 42 is formed on the fixing part 20, and a positioning pillar 44 is correspondingly formed on the case 18. The engaging portion 42 is used for engaging with the positioning pillar 44 so as to position the fixing part 20 on the case 18. The linkage mechanism 12 further includes a positioning screw 46. The positioning screw 46 is used for passing through a slot 48 of the case 18 and then fixing to a positioning hole 50 of the fixing part 20, so as to fix a position of the fixing part 20 relative to the case 18. In this embodiment, as shown in FIG. 1, the slot 48 is preferably an elliptical slot, meaning that the screwed position of the positioning screw 46 on the fixing part 20 may vary along the slot 48 to adjust the position of the fixing part 20 relative to the case 18.

Figure 3:
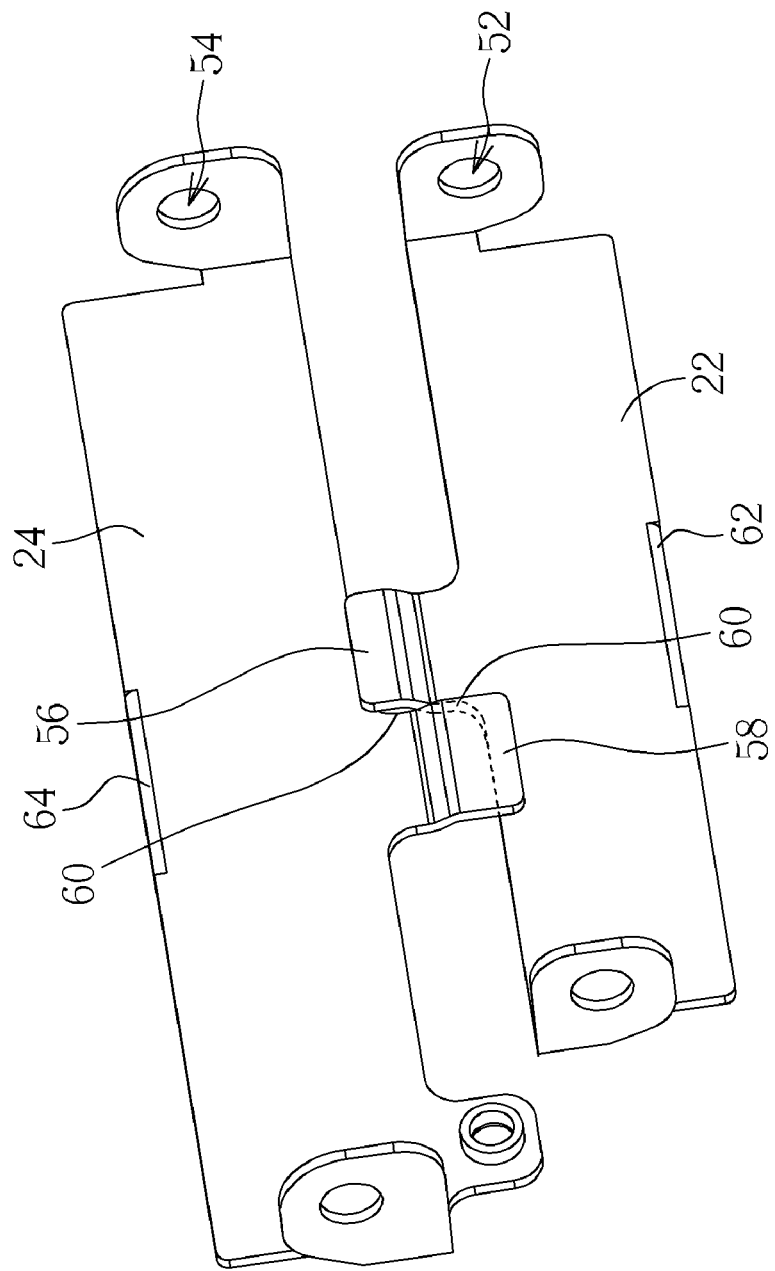
FIG. 3 is an enlarged diagram of a first rotatable lid and a second rotatable lid in FIG. 1.

Next, please refer to FIG. 1 and FIG. 3. FIG. 3 is an enlarged diagram of the first rotatable lid 22 and the second rotatable lid 24 in FIG. 1. In the present invention, the first rotatable lid 22 and the second rotatable lid 24 are used for covering the first opening 26 and the second opening 28 respectively. As shown in FIG. 3, a first positioning hole 52 and a second positioning hole 54 are formed on the first rotatable lid 22 and the second rotatable lid 24, respectively. The first positioning hole 52 and the second positioning hole 54 are used for engaging with the first positioning pillar 34 and the second positioning pillar 36 of the case 18, respectively (as shown in FIG. 1), so that the first rotatable lid 22 and the second rotatable lid 24 can be pivotally connected to the first pivot portion 30 and the second pivot portion 32 respectively. As for the method for connecting the first rotatable lid 22 and the second rotatable lid 24 to the third pivot portion 38 and the fourth pivot portion 40 respectively, the related description is omitted herein since it is similar to that for connecting the first positioning hole 52 and the second positioning hole 54 to the first positioning pillar 34 and the second positioning pillar 36 respectively. In such a manner, via pivotal connection of the first rotatable lid 22 to the first pivot portion 30 and the third pivot portion 38 and pivotal connection of the first rotatable lid 22 to the first pivot portion 30 and the third pivot portion 38, the first rotatable lid 22 and the second rotatable lid 24 are capable of rotating relative to the first opening 26 and the second opening 28 respectively.

Furthermore, as shown in FIG. 3, a first protruding part 56 is extensively formed on a center position of the first rotatable lid 22, and a second protruding part 58 is extensively formed on a center position of the second rotatable lid 24 (but not limited thereto). The first protruding part 56 is used for abutting against the second rotatable lid 24 when the first rotatable lid 22 and the second rotatable lid 24 cover the first opening 26 and the second opening 28 respectively. At the same time, the second protruding part 58 abuts against the first rotatable lid 22. It should be noted that a corner rounding structure 60 is formed on the first protruding part 56 and the second protruding part 58 respectively. Thus, when the first protruding part 56 and the second protruding part 58 abut against the second rotatable lid 24 and the first rotatable lid 22 respectively, the first protruding part 56 can interfere with the second protruding part 58 along the corner rounding structure 60. That is, the present invention utilizes friction force generated from mutual interference of the first protruding part 56 and the second protruding part 58 to fix a position of the first rotatable lid 22 relative to the second rotatable lid 24.

Disposal of the first electronic device 14 and the second electronic device 16 in the linkage mechanism 12 may vary with their device types. If the first electronic device 14 is a removable electronic device, such as a removable hard disk drive, the first electronic device 14 is disposed in the linkage mechanism 12 corresponding to the first opening 26 in a removable manner. If the first electronic device 14 is a fixed electronic device, such as a card reader, the first electronic device 14 is disposed in the linkage mechanism 12 corresponding to the first opening 26 in a built-in manner. Disposal of the second electronic device 16 may be reasoned by analogy. In the present invention, the first electronic device 14 and the second electronic device 16 are preferably a removable hard disk drive, a card reader, a floppy disk drive, a USB (Universal Serial Bus), or an optical disk drive.

Figure 4:
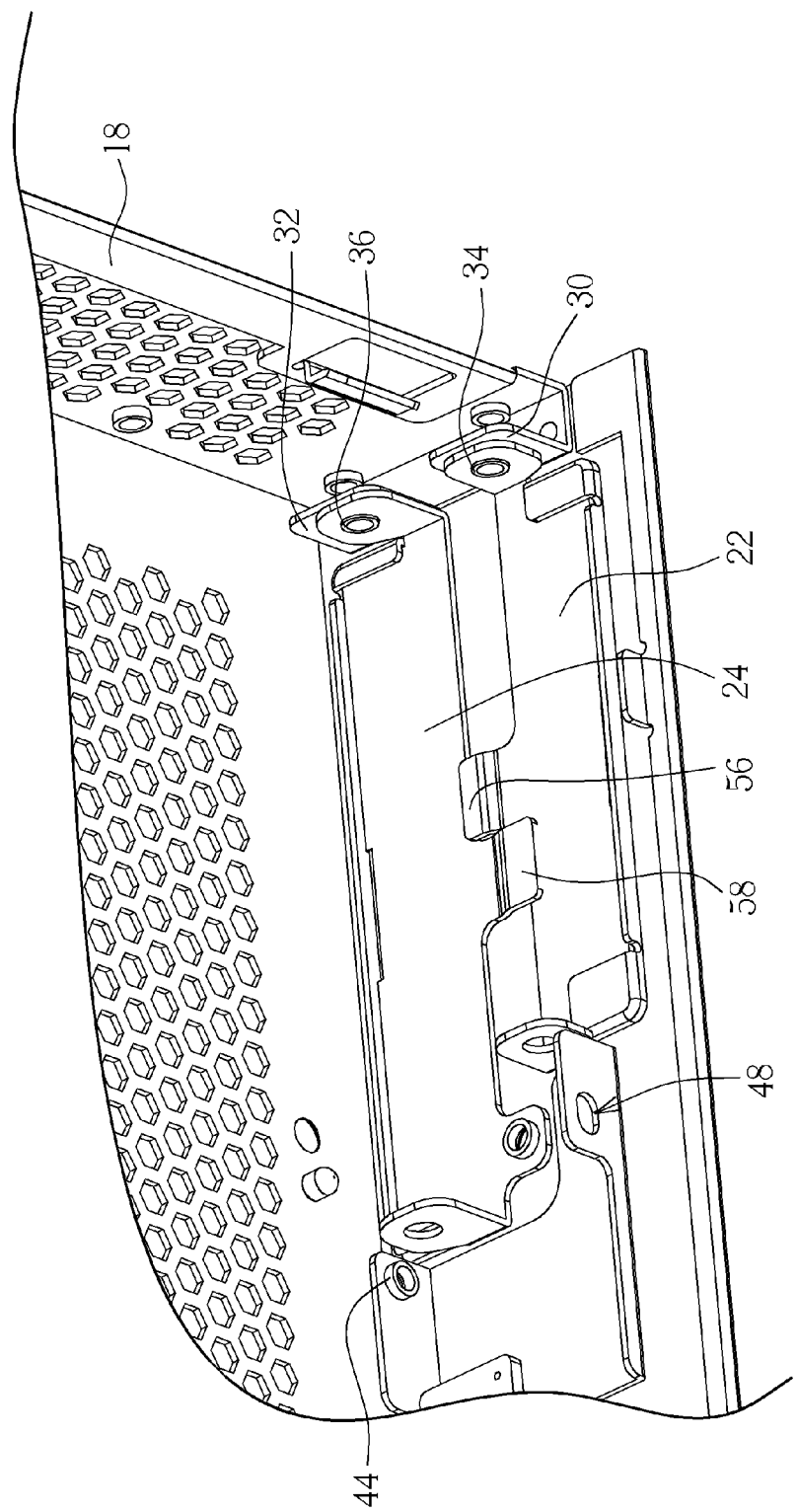
FIG. 4 is an assembly diagram of the first rotatable lid and the second rotatable lid in FIG. 3 being pivotally connected to a first pivot portion and a second pivot portion of a case respectively.

More detailed description for assembly of the linkage mechanism 12 is provided as follows. Please refer to FIG. 3 and FIG. 4. FIG. 4 is an assembly diagram of the first rotatable lid 22 and the second rotatable lid 24 in FIG. 3 being pivotally connected to the first pivot portion 30 and the second pivot portion 32 of the case 18 respectively. The first step is to align the first positioning hole 52 and the second positioning hole 54 with the first positioning pillar 34 and the second positioning pillar 36 respectively, and then insert the first positioning pillar 34 and the second positioning pillar 36 into the first positioning hole 52 and the second positioning hole 54 respectively. As a result, the first rotatable lid 22 and the second rotatable lid 24 are pivotally connected to the first pivot portion 30 and the second pivot portion 32 respectively (as shown in FIG. 4). In this embodiment, a corner rounding process is performed on the first positioning pillar 34 and the second positioning pillar 36 respectively, so that the first positioning pillar 34 and the second positioning pillar 36 can be inserted into the first positioning hole 52 and the second positioning hole 54 more smoothly and quickly.

Figure 5:
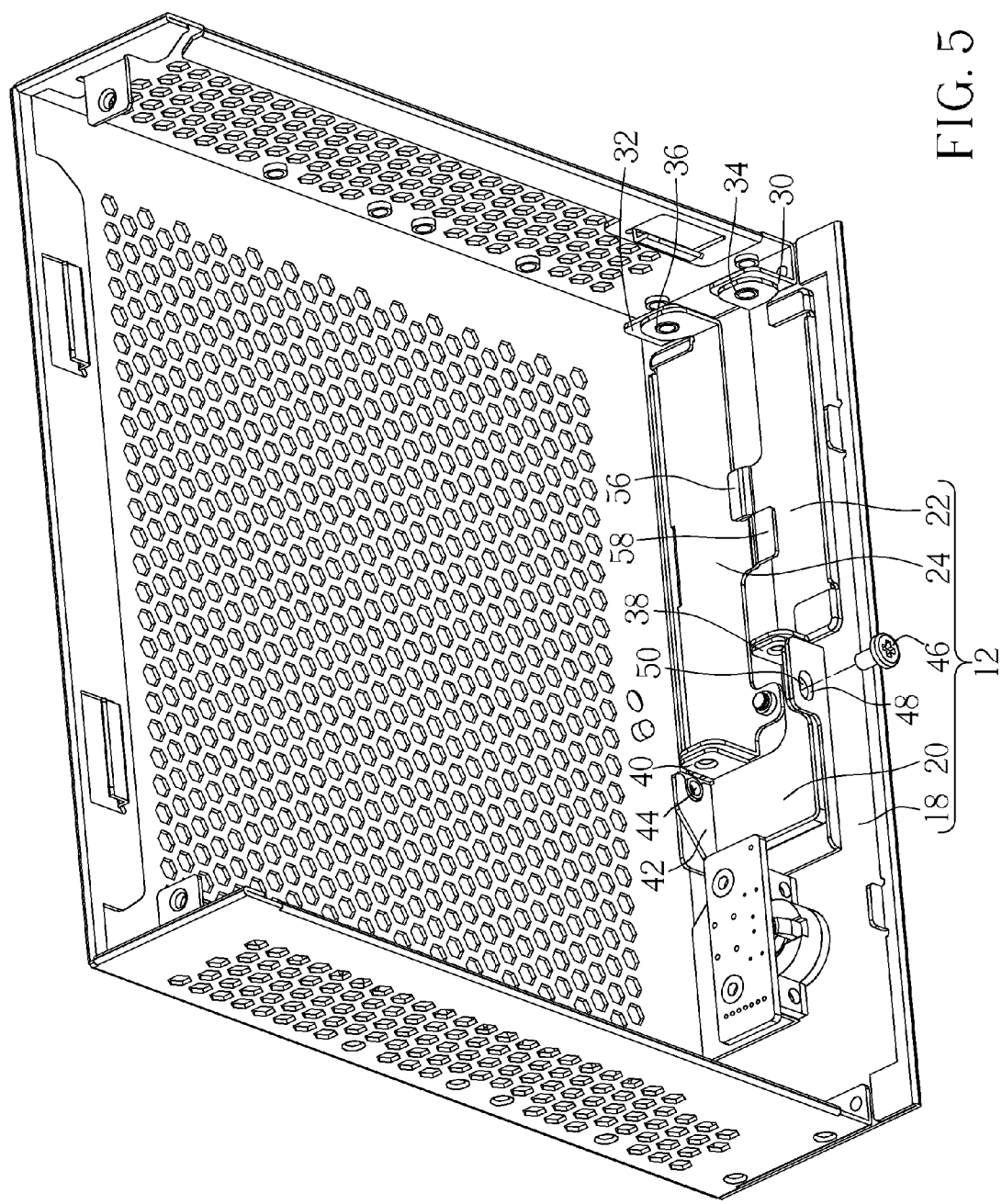
FIG. 5 is an assembly diagram of the fixing part in FIG. 2 being disposed on the case with the first rotatable lid and the second rotatable lid installed thereon.

Next, please refer to FIG. 5, which is an assembly diagram of the fixing part 20 in FIG. 2 being disposed on the case 18 with the first rotatable lid 22 and the second rotatable lid 24 installed thereon. After the first rotatable lid 22 and the second rotatable lid 24 are pivotally connected to the first pivot portion 30 and the second pivot portion 32 respectively, the engaging portion 42 of the fixing part 20 may be engaged with the positioning pillar 44 of the case 18, and then the third pivot portion 38 and the fourth pivot portion 40 may be pivotally connected to the first rotatable lid 22 and the second rotatable lid 24 respectively. As for the method for pivotally connecting the third pivot portion 38 and the fourth pivot portion 40 to the first rotatable lid 22 and the second rotatable lid 24 respectively, the related description is omitted herein since it is similar to that for pivotally connecting the first pivot portion 30 and the second pivot portion 32 to the first rotatable lid 22 and the second rotatable lid 24 respectively. Subsequently, as shown in FIG. 5, the positioning screw 46 is screwed in the positioning hole 50 of the fixing part 20 after passing through the slot 48 of the case 18, so as to fix a position of the case 18 relative to the fixing part 20. As a result, the first rotatable lid 22 and the second rotatable lid 24 can take the fixing part 20 and the case 18 as pivot points to rotate relative to the first opening 26 and the second opening 28 respectively.

Figure 6:
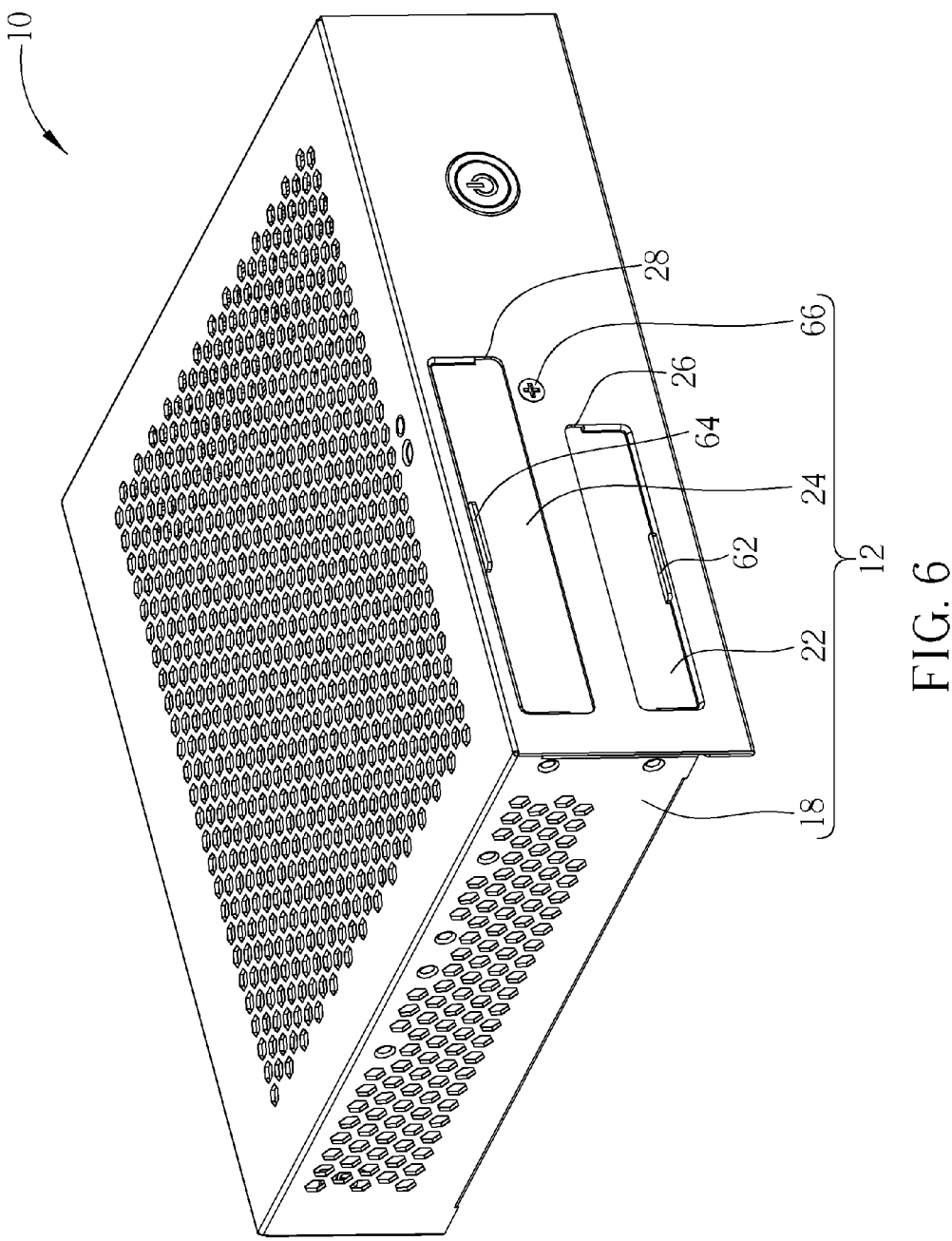
FIG. 6 is a diagram of the computer host in FIG. 1.

Please refer to FIG. 6, which is a diagram of the computer host 10 in FIG. 1. A first pulling rod 62 and a second pulling rod 64 are formed on the first rotatable lid 22 and the second rotatable lid 24 respectively, so that a user can pull the first rotatable lid 22 and the second rotatable lid 24 to rotate respectively via the first pulling rod 62 and the second pulling rod 64. Furthermore, as shown in FIG. 6, the linkage mechanism 12 further includes a fixing screw 66. The fixing screw 66 is used for fixing the second rotatable lid 24 to the case 18 when the first rotatable lid 22 and the second rotatable lid 24 cover the first opening 26 and the second opening 28 respectively. That is, after assembly of the said components located inside the case 18 is completed, the fixing screw 66 can be utilized to pass through the case 18 and then be screwed on the second rotatable lid 24, so as to finish assembly of the linkage mechanism 12. At this time, since the first protruding part 56 and the second protruding part 58 abut against the second rotatable lid 24 and the first rotatable lid 22 respectively (as shown in FIG. 5), both the first rotatable lid 22 and the second rotatable lid 24 can be fixed at positions as shown in FIG. 6 only by screwing of the fixing screw 66 on the second rotatable lid 24. In such a manner, time needed for fixing the first rotatable lid 22 by another fixing screw can be saved accordingly. The method for fixing the first rotatable lid 22 and the second rotatable lid 24 by the fixing screw 66 is not limited to the said embodiment. For example, the fixing screw 66 may be screwed on the first rotatable lid 22 instead after passing through the case 18.

Next, linkage of the linkage mechanism 12 is further described in detail as follows. Please refer to FIG. 6. After assembly of the linkage mechanism 12 is completed, the computer host 10 can utilize the first rotatable lid 22 and the second rotatable lid 24 to cover the first opening 26 and the second opening 28 respectively for providing a dustproof function, and utilize screwing of the fixing screw 66 on the second rotatable lid 24 for providing a burglarproof function. Configuration of the first rotatable lid 22, the second rotatable lid 24, the case 18, and the fixing part 20 may be as shown in FIG. 5 and FIG. 6. Subsequently, if a user wants to operate the first electronic device 14 and the second electronic device 16, the user just needs to open the first rotatable lid 22 and the second rotatable lid 24 via the linkage mechanism 12, and then performs the related operations of the first electronic device 14 and the second electronic device 16. In the following, detailed description for linkage of the linkage mechanism 12 is provided on the premise that the first electronic device 14 is a card reader and the second electronic device 16 is a removable hard disk drive.

As shown in FIG. 6, if the user wants to insert a memory card into the first electronic device 14, the user needs to detach the fixing screw 66 from the case 18 for releasing the second rotatable lid 24 from the case 18, so as to make the first rotatable lid 22 and the second rotatable lid 24 capable of rotating relative to the first opening 26 and the second opening 28 respectively. Subsequently, the user can pull the first pulling rod 62 to rotate the first rotatable lid counterclockwise relative to the first opening 26, until the first opening 26 is no longer covered by the first rotatable lid 22 so as to allow the user to insert the memory card into the first electronic device 14. Synchronously, the second protruding part 58 can be pushed with rotation of the first rotatable lid 22 since the second protruding part 58 abuts against the first rotatable lid 22 (as shown in FIG. 5). Thus, the second rotatable lid 24 can be rotated relative to the second opening 28 while the first rotatable lid 22 is rotated relative to the first opening 26 (as shown in FIG. 1). In such a manner, when the first opening 26 is not covered by the first rotatable lid 22, the second opening 28 is also not covered by the second rotatable lid 24 synchronously. At this time, via friction force generated by pivotally connecting to the case 18 and the fixing part 20, the first rotatable lid 22 and the second rotatable lid 24 can be positioned at the positions as shown in FIG. 1 respectively. In addition to insert the memory card into the first electronic device 14, the user can also remove the second electronic device 16 from the case 18 if necessary. Thus, time needed for additionally rotating another rotatable lid as mentioned in the prior art can be saved accordingly.

When the user has no need to operate the first electronic device 14 and the second electronic device 16, the user can pull the first pulling rod 62 again for rotating the first rotatable lid 22 relative to the first opening 26 from the position as shown in FIG. 1 to the position as shown in FIG. 5. With rotation of the first rotatable lid 22, the first protruding part 56 may abut against the second rotatable lid 24 first and then push the second rotatable lid 24 to rotate relative to the second opening 28 until the first rotatable lid 22 is rotated to the position as shown in FIG. 5. At this time, configuration of the first rotatable lid 22, the second rotatable lid 24, the case 18, and the fixing part 20 may be as shown in FIG. 5. It should be noted that the first protruding part 56 can interfere with the second protruding part 58 along the corner rounding structure 60 when the first rotatable lid 22 and the second rotatable lid are rotated relative to the first opening 26 and the second opening 28 respectively. That is, when the first rotatable lid 22 and the second rotatable lid 24 are rotated to the positions as shown in FIG. 5 respectively, the first protruding part 56 and the second protruding part 58 can interfere with each other so as to provide friction force to fix the first rotatable lid 22 and the second rotatable lid 24 at the positions as shown in FIG. 5 steadily. Furthermore, when opening or closing the first rotatable lid 22 and the second rotatable lid 24, this corner rounding design may also let the user clearly know whether the first rotatable lid 22 and the second rotatable lid 24 interfere with each other or not, so as to help the user operate the linkage mechanism 12 correctly. Finally, after rotating the first rotatable lid 22 and the second rotatable lid 24 to the positions as shown in FIG. 6 respectively, the user just needs to use the fixing screw 66 to pass through the case 18 and then screw the fixing screw 66 on the second rotatable lid 24. In such a manner, covering of the first rotatable lid 22 and the second rotatable lid 24 upon the first opening 26 and the second opening 28 respectively and screwing of the fixing screw 66 on the second rotatable lid 24 can make the computer host 10 dustproof and burglarproof.

Similarly, if the user pulls the second pulling rod 64 to open the second rotatable lid 24 instead, the related structural linkage may be similar to that mentioned above. That is, when the user pulls the second pulling rod 64 to rotate the second rotatable lid 24, the second rotatable lid 24 may abut against the first protruding part 56 first, and then push the first protruding part 56 so as to rotate the first rotatable lid 22 relative to the first opening 26. In such a manner, the purpose of synchronously opening the first rotatable lid 22 and the second rotatable lid 24 can be achieved. On the other hand, when the user pulls the second pulling rod 64 to close the second rotatable lid 24, the second protruding part 58 may abut against the first rotatable lid 22 first, and then push the first rotatable lid 22 to rotate relative to the first opening 26 to cover the first opening 26. Thus, the purpose of synchronously closing the first rotatable lid 22 and the second rotatable lid 24 can be achieved accordingly.

In brief, no matter the user pulls the first pulling rod 62 to rotate the first rotatable lid 22 relative to the first opening 26 or pulls the second pulling rod 64 to rotate the second rotatable lid 24 relative to the second opening 28, the present invention can utilize linkage of the first rotatable lid 22 and the second rotatable lid 24 to achieve the purpose of synchronously rotating the first rotatable lid 22 and the second rotatable lid 24 for use convenience of the computer host 10.

It should be mentioned that disposal of the fixing part 20 on the case 18 is not limited to the said embodiment. For example, the fixing part 20 may also be integrally formed on the case instead for simplifying the assembly process of the linkage mechanism 12. In the said design, the fixing part 20 may be connected to the first rotatable lid 22 and the second rotatable lid 24 by rivets instead for convenience of assembly. Furthermore, the first protruding part 56 and the second protruding part 58 are omissible alternatively. The said design may not only simplify the structural design of the linkage mechanism 12, but also increase convenience of assembly for the linkage mechanism 12 since the first rotatable lid 22 and the second rotatable lid 24 do not interference with each other in the said design. For example, if the linkage mechanism 12 only has a first protruding part 56 formed on the first rotatable lid 22, the second rotatable lid 24 can still drive the first rotatable lid 22 to rotate via the first protruding part 56 when the user pulls the second pulling rod 64 to rotate the second rotatable lid 24. In such a manner, the purpose of synchronously opening the first rotatable lid 22 and the second rotatable lid 24 can still be achieved. On the other hand, if the user wants to pull the second pulling rod 64 to rotate the second rotatable lid 24 to cover the second opening 28, the first rotatable lid 22 is incapable of rotating synchronously with rotation of the second rotatable lid 24 since the second rotatable lid 24 does not have the second protruding part 58 formed thereon to push the first rotatable lid 22. Thus, the user needs to pull the first pulling rod 62 additionally to rotate the first rotatable lid 22 to cover the first opening 26. Other design variations may be reasoned by analogy. As for which design is utilized, it depends on the practical application of the computer host 10.

Besides, the number and position of the rotatable lid in the present invention is not limited to the said embodiment. For example, the computer host provided by the present invention can have more than two rotatable lids disposed thereon, and the purpose of synchronously rotating the rotatable lids can still be achieved in a manner of the rotatable lids abutting against each other or in a manner of the rotatable lids being arranged linearly. In summary, all the structural designs for synchronously rotating the rotatable lids in a manner of the rotatable lids abutting against each other may fall within the scope of the present invention.

Furthermore, the screwed position of the positioning screw 46 is not limited to the position as shown in FIG. 5. That is, it may vary along the slot 48 for adjusting the connection strength of the fixing part 20 with the first rotatable lid 22 and the second rotatable lid 24. Thus, the rotation tightness of the first rotatable lid 22 and the second rotatable lid 24 can be adjustable for meeting operation needs of the linkage mechanism 12.

Compared with the prior art, in which a side-lifting lid or a slidable lid is utilized to cover a drive expansion slot or a card reader, the present invention involves utilizing rotatable lids to pivotally connect to a computer case. In such a manner, the rotatable lids are capable of overturning inwardly relative to the computer case so as to reduce its occupied space. Besides, the present invention further involves utilizing a linkage mechanism between the rotatable lids to achieve the purpose of synchronously opening or closing more than two rotatable lids, so as to help a user detach electronic devices from a drive expansion slot or insert a memory card into a card reader quickly. In summary, the linkage mechanism provided by the present invention may not only reduce the occupied space of the rotatable lids greatly while being operated, but also increase operation convenience of the rotatable lids.

Those skilled in the art will readily observe that numerous modifications and alterations of the device and method may be made while retaining the teachings of the invention.

What is claimed is:

1. A linkage mechanism capable of rotating rotatable lids synchronously, the linkage mechanism comprising:
   a case having a first opening, a slot and a second opening formed thereon;
   a fixing part having a positioning hole and movably disposed at a side of the first opening and a side of the second opening;
   a first rotatable lid rotatably disposed on the first opening and pivotally connected to the fixing part for covering the first opening, a first protruding part being formed on the first rotatable lid;
   a second rotatable lid rotatably disposed on the second opening and pivotally connected to the fixing part for covering the second opening, the first protruding part abutting against the second rotatable lid when the first rotatable lid and the second rotatable lid cover the first opening and the second opening respectively; and
   a positioning screw for disposing through the slot of the case and engaging with the positioning hole of the fixing part so as to fix a position of the fixing part relative to the case to adjust connection strength of the fixing part with the first rotatable lid and the second rotatable lid.

2. The linkage mechanism of claim 1, wherein when the second rotatable lid rotates relative to the second opening, the second rotatable lid drives the first protruding part to rotate the first rotatable lid relative to the first opening.

3. The linkage mechanism of claim 1, wherein when the first rotatable lid rotates relative to the first opening, the first protruding part drives the second rotatable lid to rotate relative to the second opening so as to cover the second opening.

4. The linkage mechanism of claim 1, wherein the case has a first pivot portion formed at a side of the first opening and a second pivot portion formed at a side of the second opening, the first rotatable lid is pivotally connected to the first pivot portion, and the second rotatable lid is pivotally connected to the second pivot portion.

5. The linkage mechanism of claim 4, wherein a first positioning pillar is formed on the first pivot portion for engaging with a first positioning hole of the first rotatable lid, and a second positioning pillar is formed on the second pivot portion for engaging with a second positioning hole of the second rotatable lid.

6. The linkage mechanism of claim 4, wherein a third pivot portion is formed at a position of the fixing part corresponding to the first pivot portion and a fourth pivot portion is formed at a position of the fixing part corresponding to the second pivot portion, the first rotatable lid is pivotally connected to the first pivot portion and the third pivot portion, and the second rotatable lid is pivotally connected to the second pivot portion and the fourth pivot portion.

7. The linkage mechanism of claim 1, wherein an engaging portion is formed on the fixing part, a positioning pillar is formed on the case corresponding to the engaging portion, and the engaging portion is used for engaging with the positioning pillar so as to position the fixing part on the case.

8. The linkage mechanism of claim 1, wherein a second protruding part is formed on the second rotatable lid, and the second protruding part abuts against the first rotatable lid when the first rotatable lid and the second rotatable lid cover the first opening and the second opening respectively.

9. The linkage mechanism of claim 8, wherein when the first rotatable lid rotates relative to the first opening, the first rotatable lid drives the second protruding part so as to cause the second rotatable lid to rotate relative to the second opening.

10. The linkage mechanism of claim 8, wherein when the second rotatable lid rotates relative to the second opening, the second protruding part drives the first rotatable lid to rotate relative to the first opening so as to cover the first opening.

11. The linkage mechanism of claim 8, wherein when the first protruding part and the second protruding part abut against the second rotatable lid and the first rotatable lid respectively, the first protruding part and the second protruding part interfere with each other to fix a position of the second rotatable lid relative to the first rotatable lid.

12. The linkage mechanism of claim 11, wherein a corner rounding structure is respectively formed on each of the first protruding part and the second protruding part where the first protruding part and the second protruding interfere with each other.

13. A computer host capable of rotating rotatable lids synchronously, the computer comprising:
   a linkage mechanism capable of rotating rotatable lids synchronously, the linkage mechanism comprising:

a case having a first opening, a slot and a second opening formed thereon;

a fixing part having a positioning hole and movably disposed at a side of the first opening and a side of the second opening;

a first rotatable lid rotatably disposed on the first opening and pivotally connected to the fixing part for covering the first opening, a first protruding part being formed on the first rotatable lid; and a second rotatable lid rotatably disposed on the second opening and pivotally connected to the fixing part for covering the second opening, the first protruding part abutting against the second rotatable lid when the first rotatable lid and the second rotatable lid cover the first opening and the second opening respectively; and a positioning screw for disposing through the slot of the case and engaging with the positioning hole of the fixing part so as to fix a position of the fixing part relative to the case to adjust connection strength of the fixing part with the first rotatable lid and the second rotatable lid;

a first electronic device disposed at a position of the linkage mechanism corresponding to the first opening; and a second electronic device disposed at a position of the linkage mechanism corresponding to the second opening.

14. The computer host of claim 13, wherein when the second rotatable lid rotates relative to the second opening, the second rotatable lid drives the first protruding part to rotate the first rotatable lid relative to the first opening.

15. The computer host of claim 13, wherein when the first rotatable lid rotates relative to the first opening, the first protruding part drives the second rotatable lid to rotate relative to the second opening so as to cover the second opening.

16. The computer host of claim 13, wherein the case has a first pivot portion formed at a side of the first opening and a second pivot portion formed at a side of the second opening, the first rotatable lid is pivotally connected to the first pivot portion, and the second rotatable lid is pivotally connected to the second pivot portion.

17. The computer host of claim 16, wherein a first positioning pillar is formed on the first pivot portion for engaging with a first positioning hole of the first rotatable lid, and a second positioning pillar is formed on the second pivot portion for engaging with a second positioning hole of the second rotatable lid.

18. The computer host of claim 16, wherein a third pivot portion is formed at a position of the fixing part corresponding to the first pivot portion and a fourth pivot portion is formed at a position of the fixing part corresponding to the second pivot portion, the first rotatable lid is pivotally connected to the first pivot portion and the third pivot portion, and the second rotatable lid is pivotally connected to the second pivot portion and the fourth pivot portion.

19. The computer host of claim 13, wherein a second protruding part is formed on the second rotatable lid, and the second protruding part abuts against the first rotatable lid when the first rotatable lid and the second rotatable lid cover the first opening and the second opening respectively.

\* \* \* \* \*